United States Patent
Arribio

(10) Patent No.: US 12,187,906 B2
(45) Date of Patent: Jan. 7, 2025

(54) VARIABLE REFRACTIVE INDEX THIN FILMS

(71) Applicant: Meta Platforms Technologies, LLC, Menlo Park, CA (US)

(72) Inventor: Alejo Lifschitz Arribio, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/069,148

(22) Filed: Dec. 20, 2022

(65) Prior Publication Data

US 2023/0340286 A1   Oct. 26, 2023

Related U.S. Application Data

(60) Provisional application No. 63/333,072, filed on Apr. 20, 2022.

(51) Int. Cl.
| | |
|---|---|
| *C09D 11/322* | (2014.01) |
| *C01G 19/00* | (2006.01) |
| *C09D 11/36* | (2014.01) |
| *G02B 1/10* | (2015.01) |
| *G02B 27/01* | (2006.01) |

(52) U.S. Cl.
CPC .......... *C09D 11/322* (2013.01); *C01G 19/006* (2013.01); *C09D 11/36* (2013.01); *G02B 1/10* (2013.01); *G02B 27/0172* (2013.01); *G02B 2027/0178* (2013.01)

(58) Field of Classification Search
CPC .... C09D 11/322; C09D 11/36; C01G 19/006; G02B 1/10; G02B 27/0172; G02B 2027/0178

See application file for complete search history.

(56) References Cited

U.S. PATENT DOCUMENTS

| | | |
|---|---|---|
| 11,391,950 B2 | 7/2022 | Calafiore |
| 2006/0131238 A1 | 6/2006 | Xu |
| 2008/0022896 A1 | 1/2008 | Karkkainen |
| 2017/0121821 A1 | 5/2017 | Phillips et al. |

(Continued)

FOREIGN PATENT DOCUMENTS

JP       H10147892 A       6/1998

OTHER PUBLICATIONS

Goldsmith S., et al., "Modeling the Optical Properties of Tin Oxide Thin Films," Thin Solid Films, vol. 517, No. 17, Mar. 12, 2009, pp. 5146-5150.

(Continued)

*Primary Examiner* — Robert S Walters, Jr.
(74) *Attorney, Agent, or Firm* — Greenberg Traurig, LLP

(57) ABSTRACT

A method of forming a variable refractive index thin film includes forming a coating including a tin (II) halide precursor and a liquid solvent, where the composition and/or concentration of the liquid solvent may vary spatially over one or more lateral dimension(s) of the coating. Annealing at elevated temperature may induce densification of the coating and the formation of a thin film having a variable refractive index. Local variability in the refractive index may be correlated to the location oxidation state of tin within the thin film, which may be related to the conformation of the liquid solvent.

17 Claims, 11 Drawing Sheets

(56) References Cited

U.S. PATENT DOCUMENTS

| | | |
|---|---|---|
| 2018/0105719 A1 | 4/2018 | Hintermann et al. |
| 2023/0257279 A1* | 8/2023 | Lifschitz Arribio ..... C09D 7/48 |
| | | 359/586 |

OTHER PUBLICATIONS

International Search Report and Written Opinion for International Application No. PCT/US2023/018758, mailed Aug. 4, 2023, 10 pages.

Marikkannan M., et al., "A Novel Synthesis of Tin Oxide Thin Films by the Sol-Gel Process for Optoelectronic Applications," AIP Advances, American Institute of Physics, Feb. 13, 2015, vol. 5, No. 2, 8 pages.

Aswathy B.R., et al., "Deposition of Tin Oxide Thin Film by Sol-Gel Dip Coating Technique and its Characterization," AIP Conference Proceedings, Oct. 29, 2019, vol. 2162, No. 1,6 pages.

Barhoum M., et al., Rapid Sol-Gel Fabrication of High-Quality Thin-Film Stacks on Planar and Curved Substrates, Chemistry of Materials, 2011,23(23), pp. 5177-5184.

Blanco E., et al., Insights into the Annealing Process of Sol-Gel $TiO_2$ Films Leading to Anatase Development: The Interrelationship between Microstructure and Optical Properties, Applied Surface Science, 2018, vol. 439, 32 pages.

Coppens P., et al., Crystallography and Properties of Polyoxotitanate Nanoclusters, Chemical Reviews, May 2014, vol. 114, pp. 9645-9661.

Gareso P.L., et al., Influence of Annealing on Structural and Optical Properties of n-$TiO_2$ Thin Films Grown by Sol-Gel Spin Coating, Journal of Physics: Conference Series, 2019, vol. 1242, 012037, 8 pages.

Gul S., et al., "Tin Oxide Thin Films Prepared by Sol-Gel for PV Applications," Materials Today: Proceedings, Dec. 4, 2015, vol. 2, No. 2, pp. 5793-5798.

Hwang Y.H., et al., "Ultraviolet Photo-annealing Process for Low Temperature Processed Sol-gel Zinc Tin Oxide Thin Film Transistors," Electrochemical and Solid-state Letters, 2012, vol. 15, No. 4, pp. H91-H93.

International Preliminary Report on Patentability for International Application No. PCT/US2023/011301, mailed Aug. 2, 2024, 8 pages.

International Search Report and Written Opinion for International Application No. PCT/US2023/011301, mailed May 4, 2023, 10 pages.

Kim J.M., et al., "Holographic Optical Elements Recorded in Silver Halide Sensitized Gelatin Emulsions. Part I. Transmission Holographic Optical Elements," Applied Optics, 2001, vol. 40, No. 5, pp. 622-632, Retrieved from the Internet URL: https://opg.optica.org/ao/abstract.cfm?uri=ao-40-5-622.

Lodh S., et al., "Bandgap Engineering of Sol-Gel Spin-Coated $TiO_2$ Thin Film on Glass Substrate," Photonics, Plasmonics and Information Optics, 2021, 18 pages, DOI: 10.1201/9781003047193-2.

Lu Y., et al., Modifying the Surface Properties of Superparamagnetic Iron Oxide Nanoparticles through a Sol-Gel Approach, Nano Letters, 2002, vol. 2, No. 3, pp. 183-186.

Matthews P.D., et al., Structure, Photochemistry and Applications of Metal-Doped Polyoxotitanium Alkoxide Cages, Chemical Communications, Jul. 2014, vol. 50, pp. 12815-12823.

Neipp C., et al., "Optimization of Photopolymer Materials for the Fabrication of a Holographic Waveguide," Polymers, 2017, vol. 9, No. 9, 10 Pages, Retrieved from the Internet URL: https://www.mdpi.com/2073-4360/9/9/395.

Non-Final Office Action mailed Jan. 11, 2024 for U.S. Appl. No. 17/582,614, filed Jan. 24, 2022, 9 pages.

Notice of Allowance mailed May 2, 2024 for U.S. Appl. No. 17/582,614, filed Jan. 24, 2022, 7 pages.

Odinokov S.B., et al., "Augmented Reality Display Based on Photo-Thermo-Refractive Glass Planar Waveguide," Optics Express, Jun. 8, 2020, vol. 28, No. 12, pp. 17581-17594.

Prosposito P., et al., "UV-nanoimprinting Lithography of Bragg Gratings on Hybrid Sol-gel Based Channel Waveguides," Solid State Sciences, Nov. 2010, vol. 12, No. 11, pp. 1886-1889, Retrieved from the Internet URL: https://www.sciencedirect.com/science/article/abs/pii/S1293255810001287?via%3Dihub.

Rozes L., et al., Titanium Oxo-Clusters: Precursors for a Lego-Like Construction of Nanostructured Hybrid Materials, Chemical Society Reviews, 2011, vol. 40, pp. 1006-1030.

Sanctis S., et al., "Direct Photopatterning of Solution-processed Amorphous Indium Zinc Oxide and Zinc Tin Oxide Semiconductors—A Chimie Douce Molecular Precursor Approach to Thin Film Electronic Oxides," Advanced Materials Interfaces, 2018, vol. 5, No. 15, 8 Pages.

Sano K., et al., "Optically Transparent Colloidal Dispersion of $TiO_2$ Nanoparticles Storable for longer than One year Prepared by Sol/Gel Progressive Hydrolysis/Condensation," ACS Applied Materials Interfaces, 2020, 12(40), 13 pages.

Taherniya A., et al., Thickness Dependence of Structural, Optical and Morphological Properties of Sol-Gel Derived $TiO_2$ Thin Film, Materials Research Express, 2019, vol. 6, 20 pages.

Tanski T., et al., "Influence of Calcination Temperature on Optical and Structural Properties of $TiO_2$ Thin Films Prepared by Means of Sol-Gel and Spin Coating," Bulletin of the Polish Academy of Sciences Technical Sciences, 2018, vol. 66, No. 2, pp. 151-156.

Touam T., et al., "Sol-gel Glass Waveguides with Bragg Grating," Optical Engineering, Apr. 1, 1998, vol. 37, No. 4, 7 Pages, Retrieved from the Internet URL: https://www.spiedigitallibrary.org/journals/optical-engineering/volume-37/issue-4/0000/Sol-gel-glass-waveguides-with-Bragg-grating/10.1117/1.601947.short.

Wang N., et al., "Laterally-Driven Piezoelectric Bimorph Mems Actuator With Sol-Gel-Based High-Aspect-Ratio PZT Structure," IEEE 26th International Conference on Micro Electro Mechanical Systems (MEMS), 2013, pp. 197-200.

Yan L., et al., Porous $TiO_2$ Conformal Coating on Carbon Nanotubes as Energy Storage Materials, Electrochimica Acta, 2015, vol. 169, pp. 73-81.

Zhang N., et al., "Improved Holographic Waveguide Display System," Applied Optics, Apr. 20, 2015, vol. 54, No. 12, pp. 3645-3649.

\* cited by examiner

| Trial | Zone | Component 1 | Component 1 conc | Component 2 | Component 2 conc | Annealing Temperature | RI@520 nm | Absorption | Gap-Fill |
|---|---|---|---|---|---|---|---|---|---|
| 1 | 1 | 7.5% (3 nm ZrO₂) + 2.5% (Acrylic Resin) in PGMEA | 100% | 7.5% (15 nm ZrO₂) + 2.5% (Acrylic Resin) in PGMEA | 0% | UV + 180 °C | 1.64 | < 0.1% | Good |
| 1 | 2 | | 50% | | 50% | | 1.69 | < 0.1% | Some Voiding |
| 1 | 3 | | 0% | | 100% | | 1.77 | < 0.1% | Voiding |
| 2 | 1 | 2.5% (3 nm ZrO₂) + 2.5% (Acrylic Resin) in PGMEA | 100% | 9% (3 nm ZrO₂) + 1% (Acrylic Resin) in PGMEA | 0% | UV + 180 °C | 1.61 | < 0.1% | Good |
| 2 | 2 | | 50% | | 50% | | 1.67 | < 0.1% | Good |
| 2 | 3 | | 0% | | 100% | | 1.76 | < 0.1% | Large Ripple |
| 3 | 1 | 35% Epoxy Resin in PGMEA | 100% | 35% Polythiourethane Resin in PGMEA | 0% | UV + 140 °C | 1.55 | < 0.1% | Good |
| 3 | 2 | | 50% | | 50% | | 1.61 | < 0.1% | Good |
| 3 | 3 | | 0% | | 100% | | 1.67 | < 0.1% | Good |
| 4 | 1 | 20% PDMS in DPGME | 100% | 20% TiCl₄ + H₂O in DPGME | 0% | UV + 300 °C | 1.44 | < 0.1% | Good |
| 4 | 2 | | 50% | | 50% | | 1.83 | < 0.1% | Voiding |
| 4 | 3 | | 0% | | 100% | | 2.08 | < 0.1% | Voiding |

*FIG. 3*

| Trial | Component 1 | Component 1 Conc | Component 2 | Component 2 Conc | Coating | Temperature | RI@520 nm | Absorption | Gap-Fill |
|---|---|---|---|---|---|---|---|---|---|
| 5 | 10% SnCl$_2$ in DPGME | 100% | 10% SnCl$_2$ in IPA | 0% | 1000 rpm | 165 °C | 2.01 | < 0.1% | YES |
| 6 | | | | | | 180 °C | 2.11 | < 0.1% | YES |
| 7 | | | | | | 200 °C | 2.12 | < 0.1% | YES |
| 8 | | 80% | | 20% | 1000 rpm | 165 °C | 1.75 | < 0.1% | YES |
| 9 | | | | | | 180 °C | 1.77 | < 0.1% | YES |
| 10 | | | | | | 200 °C | 1.90 | < 0.1% | YES |
| 11 | | 50% | | 50% | 1000 rpm | 165 °C | 1.75 | < 0.1% | YES |
| 12 | | | | | | 180 °C | 1.80 | < 0.1% | YES |
| 13 | | | | | | 200 °C | 1.90 | < 0.1% | YES |
| 14 | | 20% | | 75% | 2500 rpm | 165 °C | 1.72 | < 0.1% | YES |
| 15 | | | | | | 180 °C | 1.76 | < 0.1% | YES |
| 16 | | | | | | 200 °C | 1.83 | < 0.1% | YES |
| 17 | | 0% | | 100% | 2500 rpm | 165 °C | 1.61 | < 0.1% | YES |
| 18 | | | | | | 180 °C | 1.65 | < 0.1% | YES |
| 19 | | | | | | 200 °C | 1.63 | < 0.1% | YES |

*FIG. 3 (Continued)*

| Trial | Zone | Coating Component | Ink-Jet Printing Component | Annealing Temperature | Thickness (nm) | RI@520 nm | Absorption | Gap-Fill |
|---|---|---|---|---|---|---|---|---|
| 20 | 1 | 10% SnCl$_2$ in DPGME | IPA | 140 °C | 76 | 1.72 | < 0.1% | Good |
| | 2 | | | | 68 | 1.72 | < 0.1% | Good |
| | 3 | | | | 63 | 1.69 | < 0.1% | Good |
| | 4 | | | | 61 | 1.68 | < 0.1% | Good |
| | 5 | | | | 59 | 1.67 | < 0.1% | Good |
| | 6 | | | | 55 | 1.65 | < 0.1% | Good |
| | 7 | | | | 48 | 1.64 | < 0.1% | Good |
| | 8 | | | | 42 | 1.63 | < 0.1% | Good |
| | 9 | | | | 44 | 1.61 | < 0.1% | Good |
| | 10 | | | | 37 | 1.61 | < 0.1% | Good |

*FIG. 3*
*(Continued)*

| Trial | Zone | Coating Component | Ink-Jet Printing Component | Annealing Temperature | Thickness (nm) | RI@520 nm | Absorption | Gap-Fill |
|---|---|---|---|---|---|---|---|---|
| 21 | 1 | 10% SnCl$_2$ in DPGME | IPA | 180 °C | 48 | 2.00 | < 0.1% | Good |
| | 2 | | | | 48 | 2.00 | < 0.1% | Good |
| | 3 | | | | 45 | 1.98 | < 0.1% | Good |
| | 4 | | | | 47 | 1.97 | < 0.1% | Good |
| | 5 | | | | 44 | 1.96 | < 0.1% | Good |
| | 6 | | | | 45 | 1.95 | < 0.1% | Good |
| | 7 | | | | 46 | 1.94 | < 0.1% | Good |
| | 8 | | | | 42 | 1.91 | < 0.1% | Good |
| | 9 | | | | 43 | 1.90 | < 0.1% | Good |
| | 10 | | | | 42 | 1.88 | < 0.1% | Good |

*FIG. 3 (Continued)*

| Trial | Zone | Component 1 | Component 1 conc | Component 2 | Component 2 conc | Annealing Temperature | Thickness (nm) | RI@520 nm | Absorption | Gap-Fill |
|---|---|---|---|---|---|---|---|---|---|---|
| 22 | 1 | 10% SnCl$_2$ in DPGME | 100% | 10% SnCl$_2$ in IPA | 0% | 180 °C | 73 | 2.01 | < 0.1% | Good |
| | 2 | | 50% | | 50% | | 70 | 1.86 | < 0.1% | Good |
| | 3 | | 0% | | 100% | | 68 | 1.68 | < 0.1% | Good |

*FIG. 3 (Continued)*

VARIABLE REFRACTIVE INDEX THIN FILMS

CROSS-REFERENCE TO RELATED APPLICATION

This application claims the benefit of priority under 35 U.S.C. § 119(e) of U.S. Provisional Application No. 63/333,072, filed Apr. 20, 2022, the contents of which are incorporated herein by reference in their entirety.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIG. 3 is a table summarizing the synthesis paths for forming variable refractive index thin films according to various embodiments.

Figure 1A:
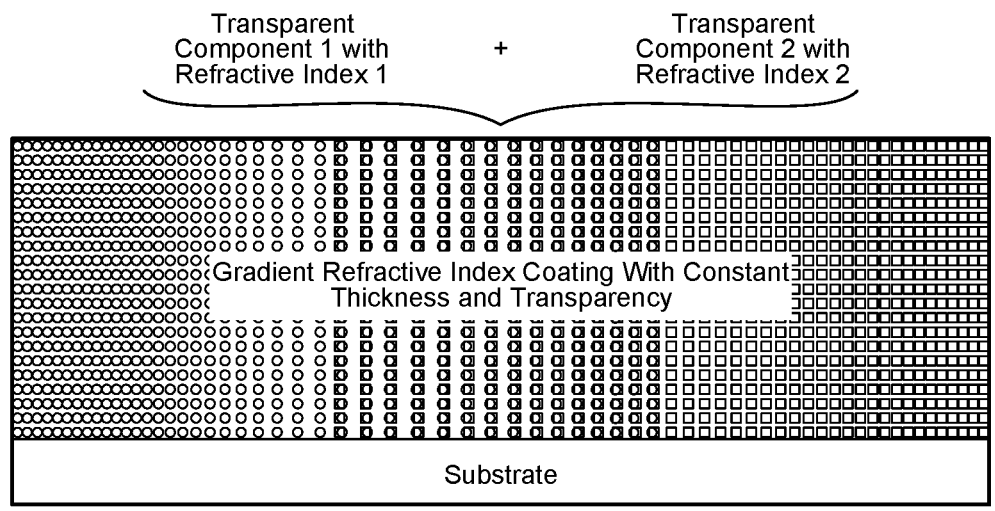
FIGS. 1A and 1B are schematic illustrations showing multi-component, gradient refractive index thin films disposed over (A) a planar substrate and (B) a structured substrate according to some embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The ability to control the refractive index (RI) of transparent optical coatings with high spatial resolution may be used to advantageously impact the performance of optical devices, such as waveguides for diffractive optics. By way of example, active control in the 1.6-2.1 refractive index range may be utilized to improve the efficiency of diffractive gratings in connection with 2D pupil replication. By progressively changing the refractive index of an optical coating as light transverses a waveguide, the output brightness and uniformity of the diffractive light can be increased or, alternatively, the waveguide design can be significantly simplified without decreasing optical performance.

The refractive index of a material is largely proportional to its density. For instance, spatial tuning of the refractive index of a thin film may include fine control of its composition and/or structure across the dimensions of the film. Moreover, when applied as a coating over a surface that contains recessed-features, such as surface-relief gratings, the variation in the coating's structure may be leveraged against its feature fill capability. This variation in composition or structure may be achieved without negatively impacting the coating's transparency and recessed-feature fill properties. In particular aspects, the transition in refractive index may be gradual and may occur due to transitions in composition or structure at a length scale below approximately 100 micrometers.

In some approaches, thin film nanocomposites may include a support resin and a mixture of transparent nanoparticles, such as metal oxide or sulfide nanoparticles with varying refractive index. The concentration of one nanoparticle component relative to the other, or the overall nanoparticle loading within the resin, may be varied to readily tune the thin film's local refractive index over a broad range, e.g., 1.6-2.1.

However, such nanocomposites may lack sufficient fluidity or flowability, for instance, which may challenge their incorporation into surface structures such as vias or trenches, particularly in examples where the nanoparticles have dimensions that are at the same scale as the surface structures. That is, the ability of a nanocomposite material to flow into structures and achieve nanometer-range planarity may be intimately tied to the nanoparticle's size, shape, and surface chemistry. Moreover, challenges in achieving uniform fill and planarity characteristics may be further exacerbated in systems having two or more compositionally or structurally different nanoparticles.

In further examples, transparent organic resins, such as epoxies or polyacrylates having different refractive indices may be blended in varying ratios in order to tune the refractive index of the mixture. The organic components may be blended into a continuous glassy structure that offers gradual index transitions and constant recessed-feature fill capabilities and transparency. The maximum refractive index of such organic resins may be limited, however, due to their relatively low density as compared to systems that include heavier atoms.

Sol gel materials represent a high density, high flow approach that may provide both the broader refractive index range of nanocomposite systems and the recessed-feature fill capabilities of organic materials. Shrinkage associated with solvent evaporation and crystallization during annealing may lead to the formation of voids, however, especially for multicomponent sol gel materials.

Notwithstanding recent developments, it would be advantageous to provide transparent optical thin films having a spatially variable refractive index. In view of the foregoing, the present disclosure is related generally to sol gel thin films having a spatially defined composition and refractive index within the range of approximately 1.6 to 2.1, and more specifically to highly transparent thin films having robust recessed-feature fill capabilities.

Sol gel processing may be used to form a super-conformal coating that self-aligns with the topography of an underlying substrate. In some examples, the shape of the substrate may be planar or complex (i.e., bent, tubular, etc.) and may further include nanometer-scale features, including recessed features. A "super-conformal" coating, as used herein, may describe a sol gel coating that fills a recessed feature while providing a planar surface above the feature.

In embodiments where the film thickness is greater than the depth of recessed features, it may be possible to fill the features with a non-annealed film. Upon annealing, however, solvent evaporation and attendant densification may cause the overlying layer to shrink and collapse, which may result in the creation of voids or cracks and a loss of fidelity/super-conformality. As disclosed further herein, various embodiments relate to a sol gel process for filling recessed features while avoiding defects from sol gel shrinkage, resulting in a planar sol gel coating having a locally variable refractive index.

As will be appreciated, sol gel materials containing multicore precursors or pre-condensed gels may be used to decrease the extent of shrinkage between the acts of coating and annealing. However, the composition of these materials is typically unstable and tends to form nanoparticles in solution over time. Furthermore, molecular oxide clusters tend to be unstable towards water and molecular oxygen and may tend to aggregate. Once aggregates and nanoparticles are formed, it may be challenging to form an optical quality and super-conformal fill of recessed features.

The annealing temperature prescribed for full densification of a sol gel coating may depend on the chemical nature of the precursor and the composition and structure of the target thin film, but in many applications is typically greater than approximately 500° C. For example, full densification of $TiO_2$ films made from monomeric precursors is observed at approximately 600° C. Alternatively, $SnO_2$ films may be annealed at temperatures less than approximately 200° C. Regardless of the temperature, annealing is used to increase RI and tune the transparency of the sol gel coating.

In some examples, the extent of shrinkage observed between the initial coating and the fully annealed thin film may be at least approximately 60% and may be as high as approximately 90%. Thus, sol gel-derived thin films typically exhibit large thickness variations during annealing.

Applicant has shown that titanium oxysulfate-based sol gel materials may be used to achieve and retain recessed feature fill throughout the annealing process. The sulfate ion may inhibit particle formation during condensation, thus mitigating the formation of voids during drying and densification. However, such formulations may achieve a maximum refractive index of only approximately 2.0, and thus may be unsuitable for certain applications.

In addition to the foregoing, Applicant has shown that compositions within the $SnO_xCl_y$ system may be prepared using a non-hydrolytic sol gel approach, where the Sn valence and O vs. Cl ratio may be controlled by the choice of liquid solvent. According to various embodiments, a sol gel technique may be used to form tin oxychloride ($SnO_x$-$Cl_y$)-containing optical coatings having a single RI value, high transparency, and good recessed-feature fill capabilities. In particular embodiments, the liquid solvent content can be varied such that the refractive index of the film after annealing may vary locally over the range of 1.6-2.1.

In some embodiments, the choice of liquid solvent may be used to control the oxidation state of tin (e.g., +2 or +4) within the $SnO_xCl_y$ system. Thus, a thin film may include tin having a first (average) valence within a first region and tin having a second (average) valence within a second region, such that the refractive index of the thin film may be locally tuned within each respective region.

Thus, as disclosed herein, a sol gel technique is used to form a variable refractive index thin film that is adapted, according to certain embodiments, to fill gaps and planarize a structured substrate.

A sol gel derived thin film may include a phase having the formula $SnO(n)X(m)$ (X=F, Cl, Br, I) where the n-m ratio may be varied across one or more dimensions of the thin film (i.e., length and/or width) such that the refractive index is locally defined without affecting the thin film's transparency and recessed-feature fill performance. A tin oxyhalide phase may be stoichiometric or non-stoichiometric.

According to particular embodiments, a $SnO(n)Cl(m)$-containing thin film may be formed using a non-hydrolytic sol gel technique, where the Sn valence and O:Cl ratio may be independently controlled upon annealing by the choice and local concentration of solvent. Annealing may include thermal annealing at a temperature up to approximately 300° C.

Suitable solvents include propylene glycol methyl ether (PGME), dipropylene glycol monomethyl ether (DPGME), propylene glycol methyl ether acetate, tripropylene glycol monomethyl ether, 1,3-dimethoxy-2-propanol, diethylene glycol (DEG), butyl lactate, propylene carbonate, isopropyl alcohol (IPA), ethanol, methanol, and water. In exemplary methods where different (i.e., first and second) solvents are used, the solvents may be independently selected from the foregoing, including mixtures thereof in any suitable combination.

Optical coatings within a tin oxyhalide system may be formed having a single refractive index value, high transparency, and good recessed-feature fill capability. Applicant has shown that the refractive index in such an annealed thin film may be spatially tuned over the range of approximately 1.6 to 2.1 with a local refractive index gradient of at least approximately 0.05 by controlling the solvent composition and concentration across one or more areal dimensions of the thin film.

In an example method, two or more Sn(II) halide solutions in different solvents or solvent mixtures may be selectively deposited over a substrate, e.g., using a dip-coating, spray-coating, ink-jet printing, screen-printing, or contact-printing process, and then annealed to form a continuous $SnO(n)X(m)$ (X=F, Cl, Br, I) coating with a spatially variable refractive index. In such a method, amongst the two or more solutions, one or both of the solvent composition and the solvent concentration may be different.

In a further example method, a Sn(II) halide solution may be first deposited onto a substrate using a technique such as spin-coating, dip-coating, spray-coating, ink-jet printing, screen-printing, or contact-printing, and thereafter a solvent or solvent mixture may be selectively deposited onto the coating to form a thin film having a spatially variable refractive index upon annealing. For instance, the solvent may be deposited such that the amount of the solvent may vary linearly across a substrate surface.

A still further example method may include forming a thin film that includes at least one Sn(II) halide precursor and at least one alcohol or glycol solvent, where the solvent composition and/or solvent concentration are varied across one or more areal dimensions of the thin film to produce variations in the thin film's refractive index after annealing. The thin film may include a continuous $SnO(n)X(m)$ layer (X=F, Cl, Br, I), where the refractive index variation mirrors the changes in the m/n ratio as well as the changes in solvent concentration and/or composition prior to annealing. In some embodiments, the solvent concentration may vary linearly across a substrate surface.

In an example embodiment, at least two solutions of Sn(II)Cl$_2$ are dissolved in at least two different solvents or solvent mixtures. The different Sn(II)Cl$_2$ solutions are then deposited onto a substrate with spatial selectivity, such that, prior to annealing, the local coating composition is varied between the initial composition of either coating solution. The hybrid coating is annealed to produce a continuous and amorphous coating with a variable refractive index, with local refractive variations of at least 0.05 and an overall refractive index variability within the range of 1.6-2.1. Further example Sn(II) halide precursors include Sn(II)Br$_2$.

The as-deposited or after-deposited solvent composition or concentration may vary linearly over the deposition surface of a coated substrate. By way of example, in a dual formulation approach, the composition or concentration of a first solvent may range generally from a minimum value to a maximum value while the composition or concentration of a second solvent may range inversely, i.e., from a maximum value to a minimum value over the same region of the substrate.

Upon thermal annealing at a temperature up to approximately 300° C. (e.g., for an annealing time of up to 10 minutes), a tin oxychloride-containing thin film may include tin in at least two different oxidation states, where a changing ratio of the different oxidation states, and hence the local changes in refractive index, is correlated to the solvent composition or concentration in the thin film prior to annealing.

The sol gel materials disclosed herein may be configured to fill recessed features on a substrate in a conformal fashion without leading to voiding upon full thermal densification of the sol gel film.

An annealed thin film may be continuous and amorphous or partially crystalline. In some embodiments, the annealed thin film may be substantially amorphous and exhibit no domain or grain formation. Example thin films may be optically transparent.

Example liquid solvents, which may be incorporated into a coating composition or subsequently deposited onto a coating, may include one or a mixture of more than one of propylene glycol methyl ether, dipropylene glycol monomethyl ether, propylene glycol methyl ether acetate, tripropylene glycol monomethyl ether, 1,3-dimethoxy-2-propanol, diethylene glycol, butyl lactate, propylene carbonate, isopropyl alcohol, methanol, and water.

According to certain embodiments, in addition to a tin oxyhalide precursor and a liquid solvent, a sol gel formulation may include one or more additives, including stabilizers, acids, bases, peroxides, surfactants, cross-linkers, flexibilizers and toughening agents. By way of example, a stabilizer may include ethanolamine, diethanolamine, triethanolamine, an aliphatic amine, a diamine, a triamine, or a polyamine. Further example stabilizers may include one or a mixture of organic antioxidants and inorganic antioxidants. According to some embodiments, a sol gel formulation may include a secondary oxo-donor, such as a peroxide.

Example methods of depositing a sol gel formulation onto a substrate include dip-coating, spray-coating, ink-jet printing, screen-printing, and contact-printing, although further deposition methods are contemplated.

According to various embodiments, an "optical quality thin film" or an "optical thin film" may, in some examples, be characterized by transmissivity within the visible light spectrum of at least approximately 80%, e.g., 80, 90 or 95%, including ranges between any of the foregoing values, and less than approximately 10% bulk haze, e.g., 0, 1, 2, 4, 6, or 8% bulk haze, including ranges between any of the foregoing values.

A material or element that is "transparent" or "optically transparent" may, for a given thickness, have a transmissivity within the visible light spectrum of at least approximately 90%, e.g., approximately 90, 95, 97, 98, 99, or 99.5%, including ranges between any of the foregoing values, and less than approximately 5% bulk haze, e.g., approximately 0.1, 0.2, 0.5, 1, 2, or 5% bulk haze, including ranges between any of the foregoing values. Transparent materials will typically exhibit very low optical absorption and minimal optical scattering. Particular example thin films may have an optical absorption of less than approximately 0.1% per 100 nm.

As used herein, the terms "haze" and "clarity" may refer to an optical phenomenon associated with the transmission of light through a material, and may be attributed, for example, to the refraction of light within the material, e.g., due to secondary phases or porosity and/or the reflection of light from one or more surfaces of the material. As will be appreciated by those skilled in the art, haze may be associated with an amount of light that is subject to wide angle scattering (i.e., at an angle greater than 2.5° from normal) and a corresponding loss of transmissive contrast, whereas clarity may relate to an amount of light that is subject to narrow angle scattering (i.e., at an angle less than 2.5° from normal) and an attendant loss of optical sharpness or "see through quality."

Features from any of the embodiments described herein may be used in combination with one another in accordance with the general principles described herein. These and other embodiments, features, and advantages will be more fully understood upon reading the following detailed description in conjunction with the accompanying drawings and claims.

The following will provide, with reference to FIGS. 1-7, detailed descriptions of sol gel-derived thin films having a locally variable refractive index, including example methods of manufacture, and resulting structures, properties, and applications. The discussion associated with FIGS. 1-5 relates to sol gel techniques and related processes for forming variable index thin films, including variable index thin films within the SnO$_x$Cl$_y$ system. The discussion associated with FIGS. 6 and 7 relates to exemplary virtual reality and augmented reality devices that may include one or more optical thin films as disclosed herein.

Figure 1B:
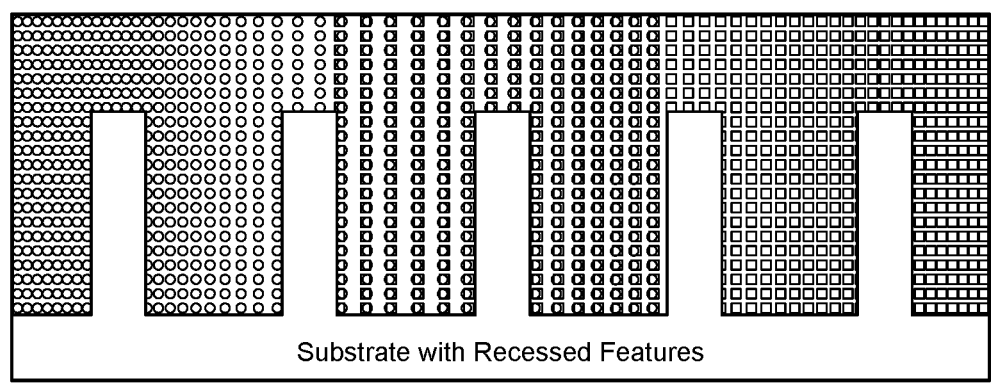

According to some embodiments, a gradient refractive index thin film may include spatially segregated index specific components. Referring to FIG. 1, shown is a schematic cross-sectional view of an inorganic thin film having a variable refractive index. The gradient refractive index coating includes a first region having a first transparent component (transparent component 1) with a first refractive index and a second adjacent region having a second transparent component (transparent component 2) with a second refractive index. As illustrated, the gradient refractive index coating may be disposed over a planar substrate as shown in FIG. 1A, or over a structured substrate as shown in FIG. 1B.

Figure 2A:
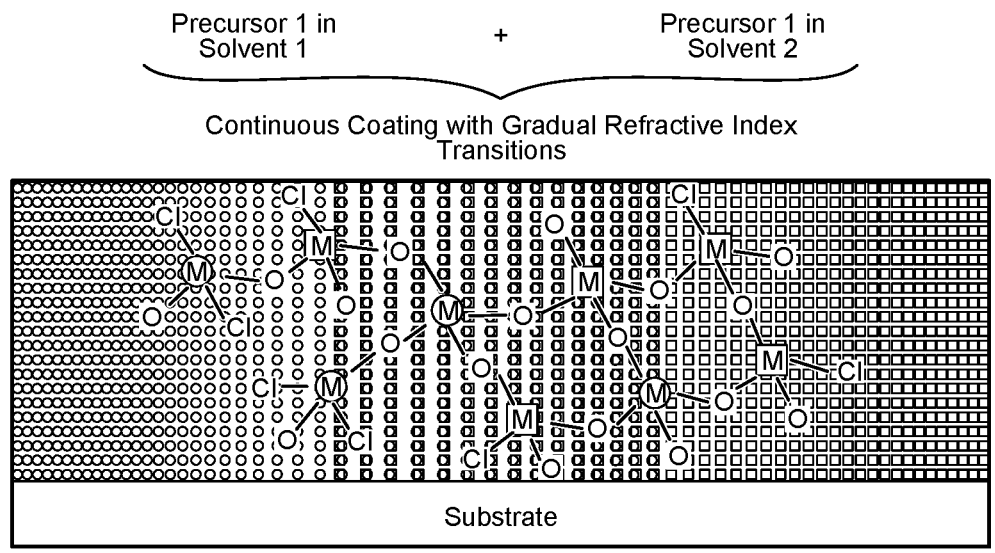
FIGS. 2A and 2B are schematic illustrations showing sol gel-derived gradient refractive index thin films formed using spatially segregated solvents disposed over (A) a planar substrate and (B) a structured substrate according to some embodiments.
Figure 2B:
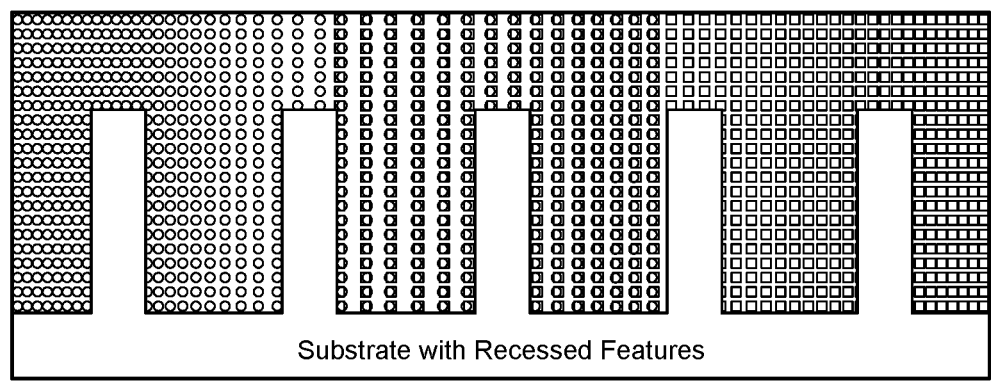
Figure 4:
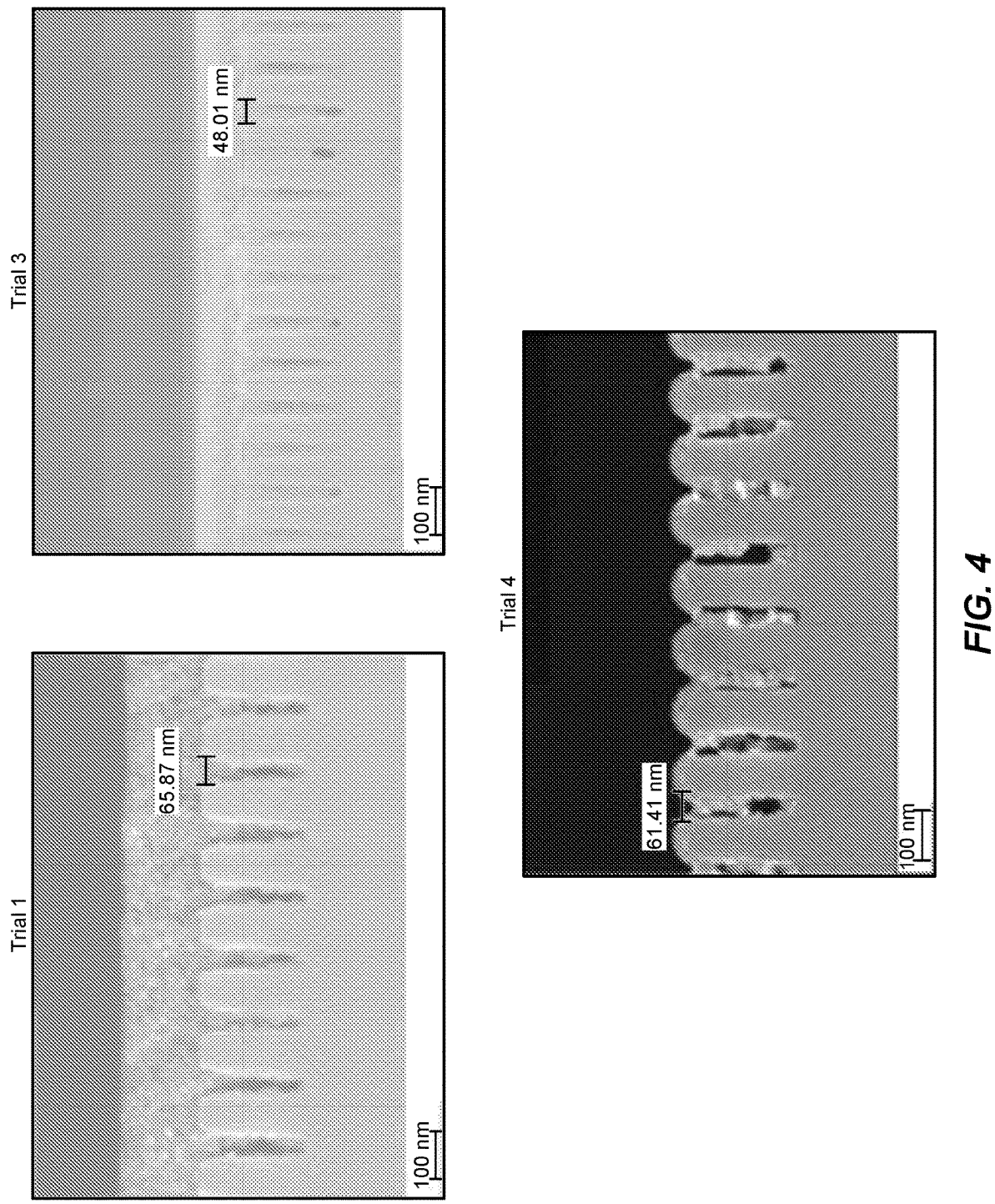
FIG. 4 shows cross-sectional SEM micrographs illustrating recessed-feature fill properties for comparative organic and inorganic thin films.
Figure 5:
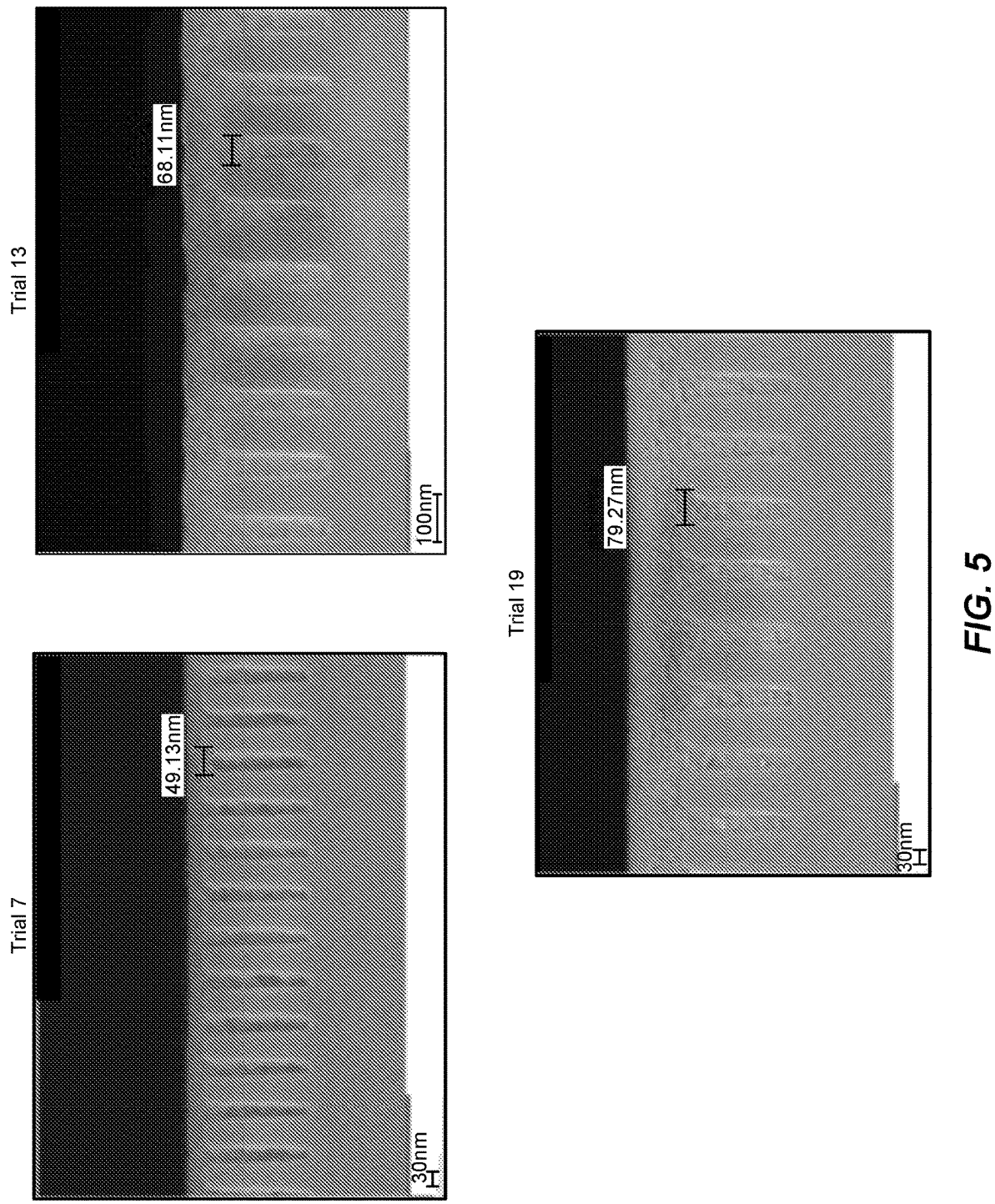
FIG. 5 shows cross-sectional SEM micrographs illustrating recessed-feature fill properties for example sol gel-derived thin films in accordance with various embodiments.

According to further embodiments, a gradient refractive index coating may include a single transparent component where the local refractive index may be modulated by a spatially segregated choice of solvent. Such an inorganic thin film is shown in FIG. 2. In the embodiment of FIG. 2, a gradient refractive index coating includes a first region having a transparent component (precursor 1) and a first liquid solvent (solvent 1) and an adjacent second region having the transparent component and a second liquid solvent (solvent 2). The first and second liquid solvents may independently interact with the transparent component to locally tune the refractive index of the thin film. As shown in FIG. 2A, the gradient refractive index coating may be disposed over a planar substrate. As shown in FIG. 2B, the gradient refractive index coating may be disposed over a structured substrate.

Comparative and inventive synthesis routes for forming variable refractive index thin films are tabulated in FIG. 3. Additional synthesis details are described herein below with reference to the annotated Trials 1-22.

Trial 1 (Comparative)

Two different suspensions were prepared each containing 7.5% by weight of $ZrO_2$ nanoparticles and 2.5% by weight of acrylic resin in PGMEA. The first suspension contained $ZrO_2$ nanoparticles with an average diameter of 3 nm and the second suspension contained $ZrO_2$ nanoparticles with an average diameter of 15 nm. The suspensions were deposited onto a substrate via ink-jet printing over a 1 square inch area.

The concentration of each suspension was varied across the length of the deposited square such that on one side of the square (Zone 1) the composition consisted of the 3 nm particle suspension only, while on the opposite side of the square (Zone 3) the composition consisted of the 15 nm particle suspension only. At the center of the square (Zone 2), the composition included a 50-50 mixture of the 3 nm particle suspension and the 15 nm particle suspension. The coated substrate was exposed to UV light to cure the acrylic support resins, and the hybrid coating was annealed at 180° C.

The refractive index of the annealed thin film was greater in Zone 3 than in Zone 1, which may be attributable to the larger nanoparticle size within Zone 3. The refractive index of the annealed thin film in Zone 2 was less than the refractive index in Zone 3, but greater than the refractive index in Zone 1. Additionally, the annealed hybrid thin film exhibited high transparency. The absorption of visible light across the entire thin film was less than approximately 0.1%.

The above procedure was repeated using a substrate that contained nano-scale trenches ranging from 15 to 100 nm wide and 220 nm deep. After the coated substrate was UV-cured and annealed, the substrate was cross-sectioned within Zones 1-3 and the quality of the trench-fill by the nanocomposite suspension was evaluated using scanning electron microscopy (SEM). Within Zone 2 and Zone 3, which included varying amounts of the 15 nm particles, the deposited material did not completely fill the trenches. Instead, the trenches were only partially filled and contained voids (see the Trial 1 micrograph in FIG. 4).

The Trial 1 results show that utilizing nanoparticles of different sizes to modulate refractive index along the areal dimensions of a single coating may lead to unacceptable recessed-feature fill performance, particularly when the size of at least one of the particles is similar to the dimensions of the recessed features.

Trial 2 (Comparative)

The protocol outlined in Trial 1 was repeated using 2 suspensions containing 3 nm $ZrO_2$ nanoparticles, but with varying concentrations of the nanoparticles by weight. Zone 1 was ink-jet printed to contain 100% of a suspension with a 2.5% nanoparticle loading and Zone 3 was ink-jet printed to contain 100% of a suspension with a 9% nanoparticle loading.

Following UV curing and annealing, the refractive index within Zone 3 was greater than the refractive index within Zone 1, where the refractive index within Zone 2 had an intermediate value between that of Zone 1 and Zone 3. As in the previous Trial, the annealed hybrid thin film had high transparency, where the absorption of visible light across the entire thin film was less than approximately 0.1%.

The above procedure was repeated using a substrate that contained nano-scale trenches ranging from 15 to 100 nm wide and 220 nm deep. After the coated substrate was UV-cured and annealed, the substrate was cross-sectioned within Zones 1-3 and the quality of the trench-fill was evaluated via SEM. Within Zone 3, which contained the greatest loading of nanoparticles, large (greater than 15 nm) ripples were observed proximate to the trench tops due to decreased flow during the act of printing.

Trial 3 (Comparative)

Two different solutions were prepared containing either 35% by weight of an epoxy organic resin or 35% by weight of a polyurethane organic resin in PGMEA. The solutions were deposited onto a substrate via ink-jet printing over a 1 square inch area. The concentration of each solution was varied across the length of the square such that on one side of the square (Zone 1) the printed composition was 100% epoxy resin, while on the opposite side of the square (Zone 3), the printed composition was 100% polyurethane resin. The relative content of each solution at the center of the square (Zone 2) was equal, i.e., 50-50. The coated substrate was exposed to UV light to cure the resins, and the hybrid coating was annealed at 140° C.

Following UV curing and annealing, the refractive index across the three zones ranged from approximately 1.55 to 1.67 where the greatest refractive index value was within Zone 3. The absorption of visible light across the entire thin film was less than approximately 0.1%.

The above procedure was repeated using a substrate that contained nano-scale trenches ranging from 15 to 100 nm wide and 220 nm deep. After the coated substrate was UV-cured and annealed, the substrate was cross-sectioned within Zones 1-3 and the quality of the trench-fill was determined via SEM. As shown in the Trial 3 micrograph of FIG. 4, good recessed-feature fill performance was achieved within all three zones. From the results of Trial 3, it will be appreciated that although refractive index variation may be achievable using organic precursors, the maximum achievable refractive index value may be limited by the inherently low refractive index of organic materials as compared to inorganic materials.

Trial 4 (Comparative)

Two different sol gel solutions were prepared containing either 20% by weight of polydimethylsiloxane (PDMS) or 20% by weight of $TiCl_4$ and water in DPGME. The solutions were deposited onto a substrate via ink-jet printing over a 1 square inch area. The relative concentration of each solution was varied across the length of the square such that on one side of the square (Zone 1) the deposited layer included 100% PDMS resin solution, while on the opposite side of the square (Zone 3) the deposited layer included 100% $TiCl_4$ solution. The content of each solution in the center of the square (Zone 2) was 50%.

To advance gelation and condensation reactions to form $SiO_2$, $TiO_2$, or a mixture thereof, the coated substrate was annealed at 300° C. Following UV curing and annealing, the refractive index within Zone 3 ($TiO_2$) was greater than the refractive index within Zone 1 ($SiO_2$) due to the higher density of $TiO_2$, where the refractive index within the intermediate Zone 2 had an intermediate value between that of Zone 1 and Zone 3. The annealed thin film had high transparency, where the absorption of visible light across the entire thin film was less than approximately 0.1%.

The above procedure was repeated using a substrate that contained nano-scale trenches ranging from 15 to 100 nm wide and 220 nm deep. After the coated substrate was annealed, the substrate was cross-sectioned within Zones 1-3 and the quality of the trench-fill was determined via SEM. Referring to the Trial 4 micrograph of FIG. 4, void formation was ubiquitous within Zone 2 and Zone 3. Without wishing to be bound by theory, the formation of voids within $TiO_2$-rich zones may be attributable to the crystallization of $TiO_2$ and its attendant condensation into discrete domains or grains. The results of Trial 4 evidence the difficulty of preparing sol gel thin films having a variable refractive index that include also elevated (n>1.8) refractive index values for gap fill applications.

Trials 5-19

Tin(II) dichloride was dissolved in solvent mixtures of DPGME and IPA, including 100% DPGME, 100% IPA and intermediate mixtures of these two solvents, to reach a final tin(II) chloride concentration of 10% by mass. Details of the preparation are tabulated in FIG. 3. The resulting sol gel compositions were deposited onto silicon substrates that had been cleaned with an oxygen gas plasma. The substrates contained nano-sized trenches ranging from 15 to 100 nm wide and 220 nm deep. The coated substrates were annealed at different temperatures within the range 165-200° C., although a broader annealing range may be used, e.g., 120-250° C.

Referring still to the table of FIG. 3, refractive index values increased with increased annealing temperature, and were inversely proportional to the IPA content in the thin films. Moreover, based on SEM results, in all cases the sol gel coatings penetrated the trenches fully and remained within the trenches after annealing. Cross-sectional SEM micrographs showing the recessed-feature fill characteristics for Trials 7, 13, and 19 are presented in FIG. 5.

Finally, the sol gel compositions from Trials 5-19 were deposited onto fused silica substrates. The coated substrates were annealed within a temperature range of 165-200° C., and the absorption of the sol gel coating was measured via spectrophotometry. In all cases, the film absorbance was less than approximately 0.1%. These results show that sol gel materials based on Sn(II) halide solutions in different alcohols or glycols can be engineered to produce variable refractive index thin films. The solvent composition and concentration may be used to control the composition of the SnO(n)Cl(m) material, thus offering a process to actively control refractive index across a broad range, including higher refractive index values, e.g., greater than approximately 1.8. In some embodiments, the coated substrates may be annealed within a temperature range of 120-250° C.

Trial 20

Tin(II) chloride was dissolved DPGME to provide a tin(II) chloride concentration of 10% by mass. The resulting composition was deposited via spin coating onto a silicon substrate that had been cleaned with an oxygen gas plasma. The substrate contained nano-scale trenches ranging from 15 to 100 nm wide and 220 nm deep. The coated substrate was then placed in an ink-jet printer and IPA was deposited within a 1 square inch area over the tin(II) chloride-containing thin film. The amount of IPA deposited within the printed area was varied such that one side of the printed area contained essentially no IPA (Zone 1) and the amount of IPA delivered progressively increased as the printer was translated to the opposite side of the printed area (Zone 10). The substrate was then annealed at 140° C.

As shown in FIG. 3 for Trial 20, the refractive index of the coating progressively decreased from Zone 1 to Zone 10 from 1.72 to 1.61 as the amount of IPA delivered onto the coating was increased. The coated and IPA printed substrate was cross-sectioned and the quality of the trench-fill by the sol gel medium was determined via SEM. In all cases the sol gel coating penetrated the trenches fully and remained inside the trenches after annealing.

The spin-coating, ink-jet printing, and annealing were repeated using a fused silica substrate. The optical absorption of the sol gel coatings was measured via spectrophotometry. In all cases, the film absorbance remained less than approximately 0.1%. These results show that the solvent composition and solvent concentration in a Sn(II) sol gel coating can be varied via selective solvent deposition in order to tune the coating refractive index without compromising the transparency and recessed-feature fill capabilities of the coating.

Trial 21

The protocol of Trial 20 was repeated with a coating annealing temperature of 180° C. following the ink-jet printing of IPA. As shown in the Table of FIG. 3, the refractive index of the coating progressively decreased from Zone 1 to Zone 10 from 2.00 to 1.88 as the amount of IPA delivered onto the coating was increased. The coated and printed substrate was cross-sectioned and the quality of the trench-fill by the sol gel material was determined via SEM. In all cases the sol gel coating penetrated the trenches fully and remained inside the trenches after annealing.

The spin-coating, ink-jet printing, and annealing were repeated using a fused silica substrate. The optical absorption of the sol gel coating was measured via spectrophotometry. In all cases, the film absorbance remained less than approximately 0.1%. These results show that the annealing temperature can be varied to control the range of refractive index values in a variable refractive index thin film. Moreover, the recessed-feature fill capability can be maintained while varying the target refractive index to include values greater than approximately 1.8, whereas other classes of materials, such as nanocomposites, organic resins, and non-SnO(n)X(m) sol gels, may exhibit significant performance issues.

Trial 22

Two different sol gel compositions were prepared containing 10% by weight of tin(II) chloride in either DPGME or IPA. The solutions were deposited onto a substrate via ink-jet printing over a 1 square inch area. The concentration of each solution was varied across the length of the square such that on one side of the square the deposited layer included 100% of the DPGME-based solution (Zone 1), while on the opposite side of the square the deposited layer included 100% of the IPA-based solution (Zone 3). In the center of the square, the deposited layer included a 50-50 mixture of the DPGME-based solution and the IPA-based solution. The coated substrate was annealed at 180° C.

Following annealing, the refractive index within Zone 3 was less than the refractive index within Zone 1, and the refractive index within Zone 2 had an intermediate value between that of Zone 1 and Zone 3. The refractive index ranged from 2.01 to 1.68 within the printed area. Furthermore, the annealed hybrid thin film had high transparency, where the absorption of visible light across the entire thin film was less than approximately 0.1%.

The above procedure was repeated using a substrate that contained nano-scale trenches ranging from 15 to 100 nm wide and 220 nm deep. After the coated substrate was annealed, the substrate was cross-sectioned within Zones 1-3 and the quality of the trench-fill was determined via SEM. For each evaluated trial, the recessed-features were completely filled without any visible voids, and the sol gel layer was continuous and amorphous throughout all regions of the film. These results demonstrate that a variable refractive index optical coating having a broad refractive index range can be obtained from a single Sn(II) precursor by controlling the local concentration and composition of liquid solvent.

As disclosed herein, an inorganic thin film may have a locally defined (i.e., spatially defined) refractive index. Example thin films may be highly transparent (<0.1%/100 nm) and partially or fully amorphous and may include a local refractive index variability of at least approximately 0.05 within and over a range of approximately 1.6 to approximately 2.1. Such an inorganic thin film may be formed using a sol gel process where two or more sol gel compositions each including at least one tin(II) halide precursor and an alcohol or glycol solvent are co-deposited onto a substrate with spatial selectivity and annealed. Suitable deposition techniques may include dip-coating, spray-coating, ink-jet printing, screen-printing, contact-printing, etc.

The sol gel coating may be conformal and substantially free of voids. In exemplary embodiments, the solvent composition and/or the solvent concentration in the two or more sol gel compositions may be different, such that the deposited thin film includes tin having different oxidation states. Local variability in the oxidation state and O-to-Cl ligand ratio may produce local variability in refractive index. Suitable liquid solvents may include di(propylene glycol) methyl ether (DPGME) and isopropyl alcohol (IPA), for example, although further solvent compositions are contemplated. In some examples, reference herein to a "liquid solvent" may include reference to solvent compositions having a single component (e.g., isopropyl alcohol) or a solvent composition having plural components, i.e., a solvent mixture of two or more components (e.g., a mixture of isopropyl alcohol and di(propylene glycol) methyl ether).

The disclosed inorganic thin films may be incorporated into optical devices, such as waveguides for diffractive optics. Local control of refractive index in the range of 1.6 to 2.1 may improve the efficiency of diffractive gratings used for 2D pupil replication. According to further embodiments, by progressively changing the refractive index of an optical coating as light traverses a waveguide, the output brightness and uniformity of the diffracted light can be increased. In some embodiments, the inorganic thin film may be used as a self-planarizing fill layer within recessed features of a surface-relief grating.

EXAMPLE EMBODIMENTS

Example 1: A method includes forming a first solution containing a first tin (II) halide precursor and a first liquid solvent, forming a second solution containing a second tin (II) halide precursor and a second liquid solvent, depositing the first solution and the second solution over respective regions of a deposition surface of a substrate to form a coating, and annealing the coating to form a thin film having a variable refractive index.

Example 2: The method of Example 1, where the first and second tin (II) halide precursors each include tin (II) chloride.

Example 3: The method of any of Examples 1 and 2, where the first and second liquid solvents independently include a liquid selected from propylene glycol methyl ether, dipropylene glycol monomethyl ether, propylene glycol methyl ether acetate, tripropylene glycol monomethyl ether, 1,3-dimethoxy-2-propanol, diethylene glycol, butyl lactate, propylene carbonate, isopropyl alcohol, methanol, and water.

Example 4: The method of any of Examples 1-3, where depositing the solutions includes ink-jet printing.

Example 5: The method of any of Examples 1-4, where the solutions are deposited into trenches or vias that constitute at least a portion of the deposition surface.

Example 6: The method of any of Examples 1-5, where annealing the coating includes heating the coating to a temperature ranging from approximately 120° C. to approximately 250° C.

Example 7: The method of any of Examples 1-6, where the annealing produces tin having a first valence within a first region of the thin film and tin having a second valence within a second region of the thin film.

Example 8: The method of Example 7, where the thin film includes a first refractive index within the first region and a second refractive index within the second region.

Example 9: The method of any of Examples 7 and 8, where the thin film has a first refractive index greater than approximately 1.7 within the first region, a second refractive index greater than approximately 1.7 within the second region, and a difference between the first refractive index and the second refractive index is at least approximately 0.1.

Example 10: The method of any of Examples 1-9, further including (a) combining the first solution and the second solution at a first ratio to form a first mixture, (b) combining the first solution and the second solution at a second ratio to form a second mixture, (c) depositing the first mixture over a first region of the substrate, and (d) depositing the second mixture over a second region of the substrate.

Example 11: A method includes forming a solution including a tin (II) halide precursor and a first liquid solvent, depositing the solution onto a deposition surface of a substrate to form a coating over the substrate, depositing a second liquid solvent non-uniformly over the coating, and annealing the coating to form a thin film having a variable refractive index.

Example 12: The method of Example 11, where the first and second liquid solvents independently include a liquid selected from propylene glycol methyl ether, dipropylene glycol monomethyl ether, propylene glycol methyl ether acetate, tripropylene glycol monomethyl ether, 1,3-dimethoxy-2-propanol, diethylene glycol, butyl lactate, propylene carbonate, isopropyl alcohol, methanol, and water.

Example 13: The method of any of Examples 11 and 12, where the solution is deposited into trenches or vias that constitute at least a portion of the deposition surface.

Example 14: The method of any of Examples 11-13, where annealing the coating includes heating the coating to a temperature ranging from approximately 120° C. to approximately 250° C.

Example 15: The method of any of Examples 11-14, where the annealing produces tin having a first valence within a first region of the thin film and tin having a second valence within a second region of the thin film.

Example 16: The method of Example 15, where the thin film includes a first refractive index within the first region and a second refractive index within the second region.

Example 17: The method of any of Examples 15 and 16, where the thin film has a first refractive index greater than approximately 1.7 within the first region, a second refractive index greater than approximately 1.7 within the second region, and a difference between the first refractive index and the second refractive index is at least approximately 0.1.

Example 18: An inorganic thin film includes a tin oxyhalide phase with tin having a first valence within a first region of the thin film and tin having a second valence within a second region of the thin film.

Example 19: The inorganic thin film of Example 18, where the tin oxyhalide phase is substantially amorphous.

Example 20: The inorganic thin film of any of Examples 18 and 19, where the thin film has a first refractive index greater than approximately 1.7 within the first region, a second refractive index greater than approximately 1.7 within the second region, and a difference between the first refractive index and the second refractive index is at least approximately 0.1.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 600 in FIG. 6) or that visually immerses a user in an artificial reality (such as, e.g., virtual-reality system 700 in FIG. 7). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 6:
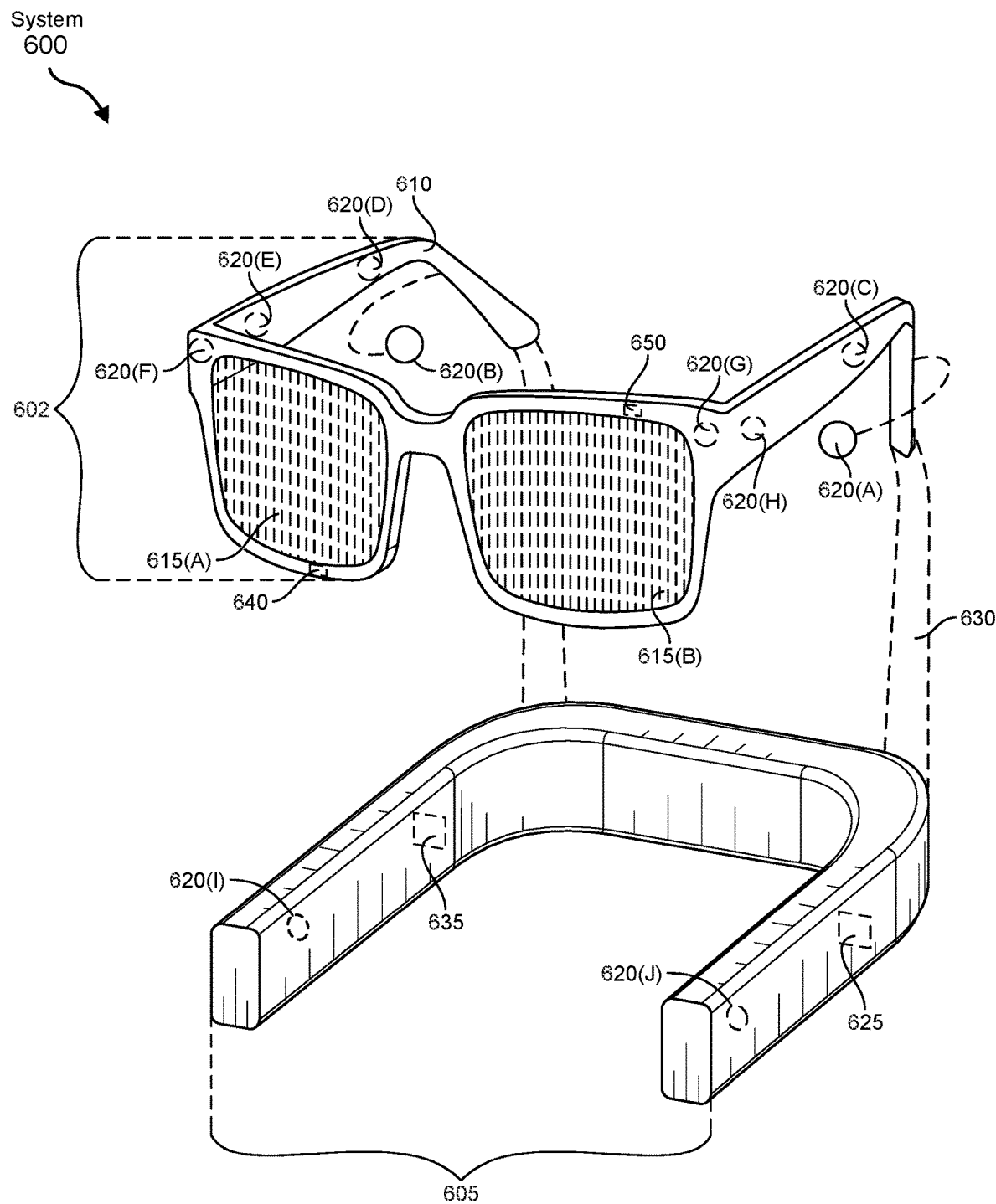
FIG. 6 is an illustration of exemplary augmented-reality glasses that may be used in connection with embodiments of this disclosure.
Figure 7:
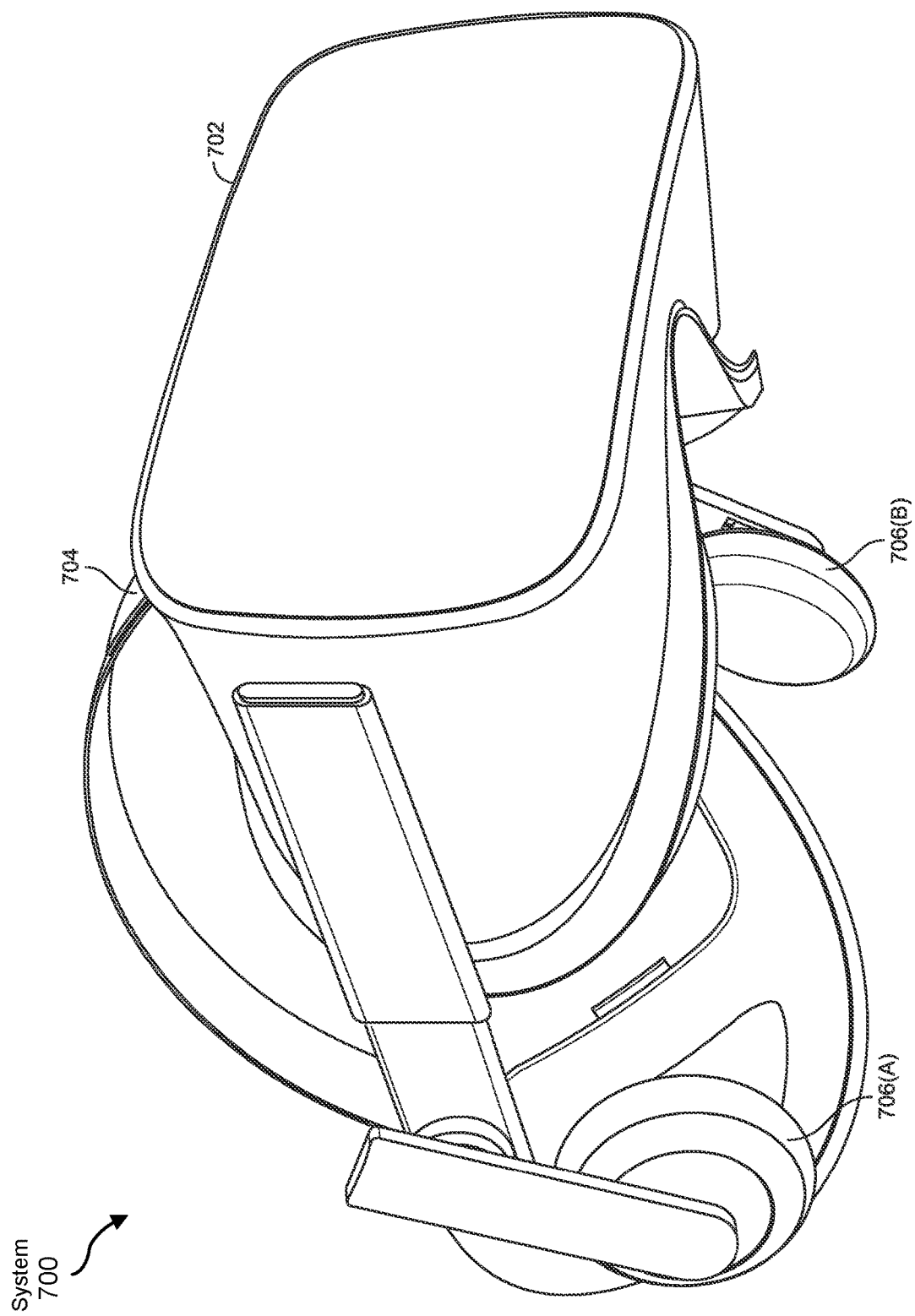
FIG. 7 is an illustration of an exemplary virtual-reality headset that may be used in connection with embodiments of this disclosure.

Turning to FIG. 6, augmented-reality system 600 may include an eyewear device 602 with a frame 610 configured to hold a left display device 615(A) and a right display device 615(B) in front of a user's eyes. Display devices 615(A) and 615(B) may act together or independently to present an image or series of images to a user. While augmented-reality system 600 includes two displays, embodiments of this disclosure may be implemented in augmented-reality systems with a single NED or more than two NEDs.

In some embodiments, augmented-reality system 600 may include one or more sensors, such as sensor 640. Sensor 640 may generate measurement signals in response to motion of augmented-reality system 600 and may be located on substantially any portion of frame 610. Sensor 640 may represent one or more of a variety of different sensing mechanisms, such as a position sensor, an inertial measurement unit (IMU), a depth camera assembly, a structured light emitter and/or detector, or any combination thereof. In some embodiments, augmented-reality system 600 may or may not include sensor 640 or may include more than one sensor. In embodiments in which sensor 640 includes an IMU, the IMU may generate calibration data based on measurement signals from sensor 640. Examples of sensor 640 may include, without limitation, accelerometers, gyroscopes, magnetometers, other suitable types of sensors that detect motion, sensors used for error correction of the IMU, or some combination thereof.

In some examples, augmented-reality system 600 may also include a microphone array with a plurality of acoustic transducers 620(A)-620(J), referred to collectively as acoustic transducers 620. Acoustic transducers 620 may represent transducers that detect air pressure variations induced by sound waves. Each acoustic transducer 620 may be configured to detect sound and convert the detected sound into an electronic format (e.g., an analog or digital format). The microphone array in FIG. 6 may include, for example, ten acoustic transducers: 620(A) and 620(B), which may be designed to be placed inside a corresponding ear of the user, acoustic transducers 620(C), 620(D), 620(E), 620(F), 620(G), and 620(H), which may be positioned at various locations on frame 610, and/or acoustic transducers 620(I) and 620(J), which may be positioned on a corresponding neckband 605.

In some embodiments, one or more of acoustic transducers 620(A)-(J) may be used as output transducers (e.g., speakers). For example, acoustic transducers 620(A) and/or 620(B) may be earbuds or any other suitable type of headphone or speaker.

The configuration of acoustic transducers 620 of the microphone array may vary. While augmented-reality system 600 is shown in FIG. 6 as having ten acoustic transducers 620, the number of acoustic transducers 620 may be greater or less than ten. In some embodiments, using higher numbers of acoustic transducers 620 may increase the amount of audio information collected and/or the sensitivity and accuracy of the audio information. In contrast, using a lower number of acoustic transducers 620 may decrease the computing power required by an associated controller 650 to process the collected audio information. In addition, the position of each acoustic transducer 620 of the microphone array may vary. For example, the position of an acoustic transducer 620 may include a defined position on the user, a defined coordinate on frame 610, an orientation associated with each acoustic transducer 620, or some combination thereof.

Acoustic transducers 620(A) and 620(B) may be positioned on different parts of the user's ear, such as behind the pinna, behind the tragus, and/or within the auricle or fossa. Or, there may be additional acoustic transducers 620 on or surrounding the ear in addition to acoustic transducers 620 inside the ear canal. Having an acoustic transducer 620 positioned next to an ear canal of a user may enable the microphone array to collect information on how sounds arrive at the ear canal. By positioning at least two of acoustic transducers 620 on either side of a user's head (e.g., as binaural microphones), augmented-reality device 600 may simulate binaural hearing and capture a 3D stereo sound field around about a user's head. In some embodiments, acoustic transducers 620(A) and 620(B) may be connected to augmented-reality system 600 via a wired connection 630, and in other embodiments acoustic transducers 620(A) and 620(B) may be connected to augmented-reality system 600 via a wireless connection (e.g., a BLUETOOTH connection). In still other embodiments, acoustic transducers 620(A) and 620(B) may not be used at all in conjunction with augmented-reality system 600.

Acoustic transducers 620 on frame 610 may be positioned in a variety of different ways, including along the length of the temples, across the bridge, above or below display devices 615(A) and 615(B), or some combination thereof. Acoustic transducers 620 may also be oriented such that the microphone array is able to detect sounds in a wide range of directions surrounding the user wearing the augmented-reality system 600. In some embodiments, an optimization process may be performed during manufacturing of augmented-reality system 600 to determine relative positioning of each acoustic transducer 620 in the microphone array.

In some examples, augmented-reality system 600 may include or be connected to an external device (e.g., a paired device), such as neckband 605. Neckband 605 generally represents any type or form of paired device. Thus, the following discussion of neckband 605 may also apply to various other paired devices, such as charging cases, smart watches, smart phones, wrist bands, other wearable devices, hand-held controllers, tablet computers, laptop computers, other external compute devices, etc.

As shown, neckband 605 may be coupled to eyewear device 602 via one or more connectors. The connectors may be wired or wireless and may include electrical and/or non-electrical (e.g., structural) components. In some cases, eyewear device 602 and neckband 605 may operate independently without any wired or wireless connection between them. While FIG. 6 illustrates the components of eyewear device 602 and neckband 605 in example locations on eyewear device 602 and neckband 605, the components may be located elsewhere and/or distributed differently on eyewear device 602 and/or neckband 605. In some embodiments, the components of eyewear device 602 and neckband 605 may be located on one or more additional peripheral devices paired with eyewear device 602, neckband 605, or some combination thereof.

Pairing external devices, such as neckband 605, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 600 may be provided by a paired device or shared between a paired device and an eyewear device, thus reducing the weight, heat profile, and form factor of the eyewear device overall while still retaining desired functionality. For example, neckband 605 may allow components that would otherwise be included on an eyewear device to be included in neckband 605 since users may tolerate a heavier weight load on their shoulders than they would tolerate on their heads. Neckband 605 may also have a larger surface area over which to diffuse and disperse heat to the ambient environment. Thus, neckband 605 may allow for greater battery and computation capacity than might otherwise have been possible on a stand-alone eyewear device. Since weight carried in neckband 605 may be less invasive to a user than weight carried in eyewear device 602, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 605 may be communicatively coupled with eyewear device 602 and/or to other devices. These other devices may provide certain functions (e.g., tracking, localizing, depth mapping, processing, storage, etc.) to augmented-reality system 600. In the embodiment of FIG. 6, neckband 605 may include two acoustic transducers (e.g., 620(I) and 620(J)) that are part of the microphone array (or potentially form their own microphone subarray). Neckband 605 may also include a controller 625 and a power source 635.

Acoustic transducers 620(I) and 620(J) of neckband 605 may be configured to detect sound and convert the detected sound into an electronic format (analog or digital). In the embodiment of FIG. 6, acoustic transducers 620(I) and 620(J) may be positioned on neckband 605, thereby increasing the distance between the neckband acoustic transducers 620(I) and 620(J) and other acoustic transducers 620 positioned on eyewear device 602. In some cases, increasing the distance between acoustic transducers 620 of the microphone array may improve the accuracy of beamforming performed via the microphone array. For example, if a sound is detected by acoustic transducers 620(C) and 620(D) and the distance between acoustic transducers 620(C) and 620(D) is greater than, e.g., the distance between acoustic transducers 620(D) and 620(E), the determined source location of the detected sound may be more accurate than if the sound had been detected by acoustic transducers 620(D) and 620(E).

Controller 625 of neckband 605 may process information generated by the sensors on neckband 605 and/or augmented-reality system 600. For example, controller 625 may process information from the microphone array that describes sounds detected by the microphone array. For each detected sound, controller 625 may perform a direction-of-arrival (DOA) estimation to estimate a direction from which the detected sound arrived at the microphone array. As the microphone array detects sounds, controller 625 may populate an audio data set with the information. In embodiments in which augmented-reality system 600 includes an inertial measurement unit, controller 625 may compute all inertial and spatial calculations from the IMU located on eyewear device 602. A connector may convey information between augmented-reality system 600 and neckband 605 and between augmented-reality system 600 and controller 625. The information may be in the form of optical data, electrical data, wireless data, or any other transmittable data form. Moving the processing of information generated by augmented-reality system 600 to neckband 605 may reduce weight and heat in eyewear device 602, making it more comfortable to the user.

Power source 635 in neckband 605 may provide power to eyewear device 602 and/or to neckband 605. Power source 635 may include, without limitation, lithium-ion batteries, lithium-polymer batteries, primary lithium batteries, alkaline batteries, or any other form of power storage. In some cases, power source 635 may be a wired power source. Including power source 635 on neckband 605 instead of on eyewear device 602 may help better distribute the weight and heat generated by power source 635.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 700 in FIG. 7, that mostly or completely covers a user's field of view. Virtual-reality system 700 may include a front rigid body 702 and a band 704 shaped to fit around a user's head. Virtual-reality system 700 may also include output audio transducers 706(A) and 706(B). Furthermore, while not shown in FIG. 7, front rigid body 702 may include one or more electronic elements, including one or more electronic displays, one or more inertial measurement units (IMUs), one or more tracking emitters or detectors, and/or any other suitable device or system for creating an artificial-reality experience.

Artificial-reality systems may include a variety of types of visual feedback mechanisms. For example, display devices in augmented-reality system 600 and/or virtual-reality system 700 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 600 and/or virtual-reality system 700 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 600 and/or virtual-reality system 700 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

The process parameters and sequence of the steps described and/or illustrated herein are given by way of example only and may be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

It will be understood that when an element such as a layer or a region is referred to as being formed on, deposited on, or disposed "on" or "over" another element, it may be located directly on at least a portion of the other element, or one or more intervening elements may also be present. In contrast, when an element is referred to as being "directly on" or "directly over" another element, it may be located on at least a portion of the other element, with no intervening elements present.

As used herein, the term "substantially" in reference to a given parameter, property, or condition may mean and include to a degree that one of ordinary skill in the art would understand that the given parameter, property, or condition is met with a small degree of variance, such as within acceptable manufacturing tolerances. By way of example, depending on the particular parameter, property, or condition that is substantially met, the parameter, property, or condition may be at least approximately 90% met, at least approximately 95% met, or even at least approximately 99% met.

As used herein, the term "approximately" in reference to a particular numeric value or range of values may, in certain embodiments, mean and include the stated value as well as all values within 10% of the stated value. Thus, by way of example, reference to the numeric value "50" as "approximately 50" may, in certain embodiments, include values equal to 50±5, i.e., values within the range 45 to 55.

While various features, elements or steps of particular embodiments may be disclosed using the transitional phrase "comprising," it is to be understood that alternative embodiments, including those that may be described using the transitional phrases "consisting of" or "consisting essentially of," are implied. Thus, for example, implied alternative embodiments to a liquid solvent that comprises or includes water include embodiments where a liquid solvent consists essentially of water and embodiments where a liquid solvent consists of water.

What is claimed is:

1. A method comprising:
   forming a first solution comprising a first tin (II) halide precursor and a first liquid solvent;
   forming a second solution comprising a second tin (II) halide precursor and a second liquid solvent;
   depositing the first solution and the second solution over respective regions of a deposition surface of a substrate to form a coating; and
   annealing the coating to form a thin film having a variable refractive index.

2. The method of claim 1, wherein the first and second tin (II) halide precursors each comprise tin (II) chloride.

3. The method of claim 1, wherein the first and second liquid solvents independently comprise a liquid selected from the group consisting of propylene glycol methyl ether, dipropylene glycol monomethyl ether, propylene glycol methyl ether acetate, tripropylene glycol monomethyl ether, 1,3-dimethoxy-2-propanol, diethylene glycol, butyl lactate, propylene carbonate, isopropyl alcohol, methanol, and water.

4. The method of claim 1, wherein depositing the solutions comprises ink-jet printing.

5. The method of claim 1, wherein the solutions are deposited into trenches or vias that constitute at least a portion of the deposition surface.

6. The method of claim 1, wherein annealing the coating comprises heating the coating to a temperature ranging from approximately 120° C. to approximately 250° C.

7. The method of claim 1, wherein the annealing produces tin having a first valence within a first region of the thin film and tin having a second valence within a second region of the thin film.

8. The method of claim 7, wherein the thin film comprises a first refractive index within the first region and a second refractive index within the second region.

9. The method of claim 7, wherein the thin film comprises a first refractive index greater than approximately 1.7 within the first region, a second refractive index greater than approximately 1.7 within the second region, and a difference between the first refractive index and the second refractive index is at least approximately 0.1.

10. The method of claim 1, further comprising:
    combining the first solution and the second solution at a first ratio to form a first mixture;
    combining the first solution and the second solution at a second ratio to form a second mixture;
    depositing the first mixture over a first region of the substrate; and
    depositing the second mixture over a second region of the substrate.

11. A method comprising:
    forming a solution comprising a tin (II) halide precursor and a first liquid solvent;
    depositing the solution onto a deposition surface of a substrate to form a coating over the substrate;
    depositing a second liquid solvent non-uniformly over the coating; and
    annealing the coating to form a thin film having a variable refractive index.

12. The method of claim 11, wherein the first and second liquid solvents independently comprise a liquid selected from the group consisting of propylene glycol methyl ether, dipropylene glycol monomethyl ether, propylene glycol methyl ether acetate, tripropylene glycol monomethyl ether, 1,3-dimethoxy-2-propanol, diethylene glycol, butyl lactate, propylene carbonate, isopropyl alcohol, methanol, and water.

13. The method of claim 11, wherein the solution is deposited into trenches or vias that constitute at least a portion of the deposition surface.

14. The method of claim 11, wherein annealing the coating comprises heating the coating to a temperature ranging from approximately 120° C. to approximately 250° C.

15. The method of claim 11, wherein the annealing produces tin having a first valence within a first region of the thin film and tin having a second valence within a second region of the thin film.

16. The method of claim 15, wherein the thin film comprises a first refractive index within the first region and a second refractive index within the second region.

17. The method of claim 15, wherein the thin film comprises a first refractive index greater than approximately 1.7 within the first region, a second refractive index greater than approximately 1.7 within the second region, and a difference between the first refractive index and the second refractive index is at least approximately 0.1.

* * * * *